(12) United States Patent
Lee et al.

(10) Patent No.: US 8,604,377 B2
(45) Date of Patent: Dec. 10, 2013

(54) AUTOMATIC TRANSFER SWITCH

(75) Inventors: Choong-Hyun Lee, Seoul (KR); Jung-Woo Lee, Gyeonggi-Do (KR)

(73) Assignee: Vitzrotech Co., Ltd, Gyeonggi-Do (KR)

( * ) Notice: Subject to any disclaimer, the term of this patent is extended or adjusted under 35 U.S.C. 154(b) by 214 days.

(21) Appl. No.: 13/183,702

(22) Filed: Jul. 15, 2011

(65) Prior Publication Data

US 2013/0015044 A1   Jan. 17, 2013

(51) Int. Cl.
*H01H 33/08* (2006.01)
(52) U.S. Cl.
USPC .......................................................... 218/149
(58) Field of Classification Search
USPC ................................................ 218/149, 157
See application file for complete search history.

(56) References Cited

U.S. PATENT DOCUMENTS

| | | | |
|---|---|---|---|
| 3,071,666 A * | 1/1963 | Ellsworth et al. | 218/149 |
| 4,612,426 A * | 9/1986 | Maier et al. | 218/151 |
| 4,804,933 A * | 2/1989 | Becker et al. | 335/186 |
| 5,319,166 A * | 6/1994 | Arnold et al. | 200/17 R |
| 7,034,242 B1 * | 4/2006 | Shea et al. | 218/157 |
| 2003/0052090 A1* | 3/2003 | Raabe et al. | 218/149 |

* cited by examiner

*Primary Examiner* — Truc Nguyen
(74) *Attorney, Agent, or Firm* — Ohlandt, Greeley, Ruggiero & Perle, LLP

(57) ABSTRACT

Disclosed is an automatic transfer switch. According to the exemplary embodiment of the present invention, the automatic transfer switch alternatively supplying power from a commercial power terminal and an emergency power terminal to load terminals by moving a pair of movable contactors, wherein at least one of the pair of movable contactors are integrally formed with the commercial power terminal or the emergency power terminal through a wire made of a flexible material.

3 Claims, 5 Drawing Sheets

EXISTING (ABOUT 100ms)

① ② ③ ④

IMPROVEMENT (ABOUT 15ms)

① ② ③ ④

① : INPUT SIGNAL

② ~ ③ : INPUT CONTINUOUS (10 cycles)

③ ~ ④ : Arc EXTINGUISHING (EXISTING-100ms, IMPROVEMENT- 15ms)

AUTOMATIC TRANSFER SWITCH

BACKGROUND OF THE INVENTION

1. Field of the Invention

The present invention relates to an automatic transfer switch, and more particularly, to an automatic transfer switch capable of effectively transferring a power supply during a power outage and for an emergency.

2. Description of the Related Art

Generally, an automatic transfer switch automatically transfers an interior wiring terminal to a private power station so as to continuously supply power when a supply of power from a substation is interrupted but again performs automatic transferring so as to be supplied with power from the substation when power is normally supplied from the substation, in workplaces, buildings, etc., which include the private power station.

The automatic transfer switch, which alternatively connects two different power supplies, such as a commercial power supply and an emergency power supply or a star connection power supply and a delta connection power supply, to load sides, has been variously developed and used according to the capacity or usage thereof.

FIG. 1 is a diagram schematically showing an automatic transfer switch according to the related art. Referring to FIG. 1, an automatic transfer switch 1 according to the related art is configured to include: a case 10 formed so that parts for a power conduction unit may be assembled therein; a commercial power terminal 20 that is installed in the case 10 and is supplied with commercial power, an emergency power terminal 30 that is supplied with power for an emergency; a load terminal 40 that alternatively contacts the commercial power terminal 20 or an emergency power terminal 30 to be supplied with power; a pair of movable contactors 50 that are formed to contact one end of the load terminal 40 and is disposed to rotate based on a contact pin 52; a swivel arm 60 that rotates the pair of movable contactors 50 and has one end coupled with the pair of movable contactors 50 by a rotating shaft 62; and an arc extinguishing chamber 70 that extinguishes an arc at the time of being contacted or short-circuited with a load terminals 40 of the movable contactors 50 rotating by the swivel arm 60.

The automatic transfer switch 1 having the above-mentioned configuration according to the related art uses a method of supplying power in the state in which the commercial power terminal 20 and the load terminal 40 are connected to each other by the movable contactors 50 at normal times, but disconnecting the commercial power terminal 20 from the load terminal 40 when the emergency power supply is used due to a power outage or repair and inspection and then, again connecting the emergency power terminal 30 to the load terminal 40.

The applicant of the present invention seeks to improve efficiency in switching power of the automatic transfer switch by improving the above-mentioned automatic transfer switch according to the related art.

SUMMARY OF THE INVENTION

An exemplary embodiment of the present invention has been made in an effort to provide an automatic transfer switch capable of reducing electrical malfunction and minimizing power loss at the time of transferring power by improving an automatic transfer switch according to the related art.

An exemplary embodiment of the present invention provides an automatic transfer switch alternatively supplying power from a commercial power terminal and an emergency power terminal to load terminals by moving a pair of movable contactors, wherein at least one of the pair of movable contactors are integrally formed with the commercial power terminal or the emergency power terminal through a wire made of a flexible material.

The automatic transfer switch may further include an arc extinguishing chamber include a plurality of grids so as to extinguish an arc generated when the pair of movable contactors are short-circuited with the load terminals, wherein the plurality of grids may be formed to surround the movable contactors that vertically rotates, one side thereof is concaved, and the concaved inside thereof is eccentrically provided with a chute part.

The plurality of grids may be installed so that chute part is disposed in a zigzag form.

The plurality of grids may be inclinedly arranged to increase upwardly at a predetermined angle.

The plurality of grids may be arranged to be gradually inclined at 5 to 10 degrees.

The automatic transfer switch according to the exemplary embodiment of the present invention can integrally form the one end of the movable contactor and the one end of the load terminal through the wire to prevent the movable contactor from being short-circuited with the load terminal even at the time of the rotation of the movable contactor, thereby removing the resistance and thus, minimizing the power loss.

Further, the automatic transfer switch according to the exemplary embodiment of the present invention can remove the arc generated at the time of the short-circuit between the movable contactor and the load terminal, thereby preventing the internal temperature from rising due to heat generation.

In addition, the automatic transfer switch according to the exemplary embodiment of the present invention can effectively surround the rotating movable contactor so as to extinguish the arc generated at the time of the short-circuit between the movable contactor and the load terminal within a rapid time, thereby dispersing the potential difference and thus, preventing current from being collected at one point.

Moreover, the automatic transfer switch according to the exemplary embodiment of the present invention can extinguish the generated arc within a rapid time and smoothly perform ventilation by inclinedly arranging the grids, thereby effectively removing heat generated caused by extinguishing the arc.

DETAILED DESCRIPTION OF THE EMBODIMENTS

Hereinafter, an automatic transfer switch according to an exemplary embodiment of the present invention will be described in more detail with reference to exemplary embodiments and the accompanying drawings.

Figure 1:
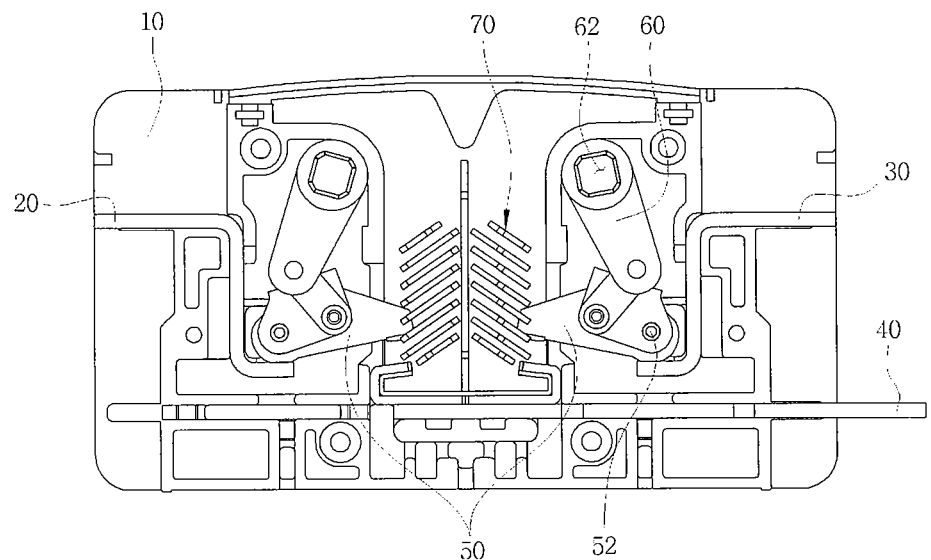
FIG. 1 is a diagram schematically showing an automatic transfer switch according to the related art.
Figure 2:
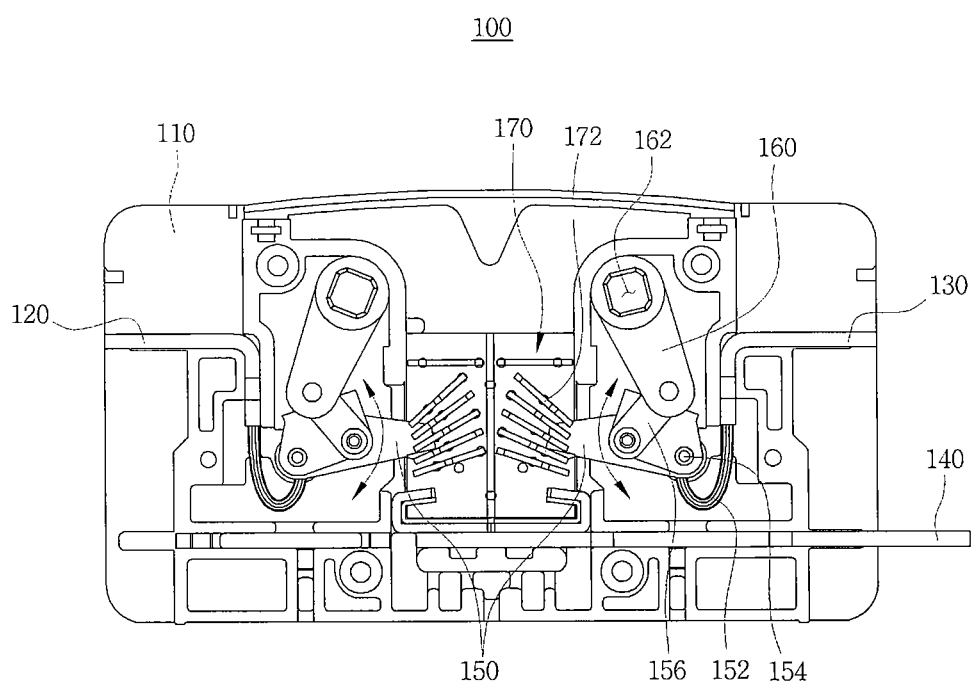
FIG. 2 is a diagram schematically showing an automatic transfer switch according to an exemplary embodiment of the present invention.

As shown in FIG. 2, an automatic transfer switch 100 according to an exemplary embodiment of the present invention is configured to include a case 110, a commercial power terminal 120 and an emergency power terminal 130, a load terminal 140, a pair of movable contactors 150, a pair of swivel arms 160, and an arc extinguishing chamber 170.

The case 110 has a rectangular shape, is formed so that the components may be assembled therein and is formed to maintain safe conduction performance.

That is, the case is formed to exclude risk factors of electric shock such as contact with the user's body or an electrical accident due to degradation in insulation performance by preventing dusts or foreign objects from being introduced thereinto in respects to long-term use.

The commercial power terminal 120 is supplied with commercial power and is disposed at one side of the case 110 and the emergency power terminal 130 is supplied with emergency power at the time of power outage or repair and inspection and is disposed at the other side of the case 110 in which the commercial power terminal 120 is installed.

The load terminal 140 is disposed at one side under the case 110 in which the commercial power terminal 120 and the emergency power terminal 130 are installed and alternatively contacts the commercial power terminal 120 and the emergency power terminal 130 by the pair of movable contactors 150, such that the load terminal 140 is formed to be supplied power transmitted from the power terminals 120 and 130.

The pair of movable contactors 150 each are integrally formed with the commercial power terminal 120 and the emergency power terminal 130 through the wire 152 so as to be electrically connected thereto.

In detail, the pair of movable contactors 150 each are rotatably formed by a contact pin 154 and one end of each movable contactor 150 may be formed to alternatively contact the load terminal 140.

Figure 3:
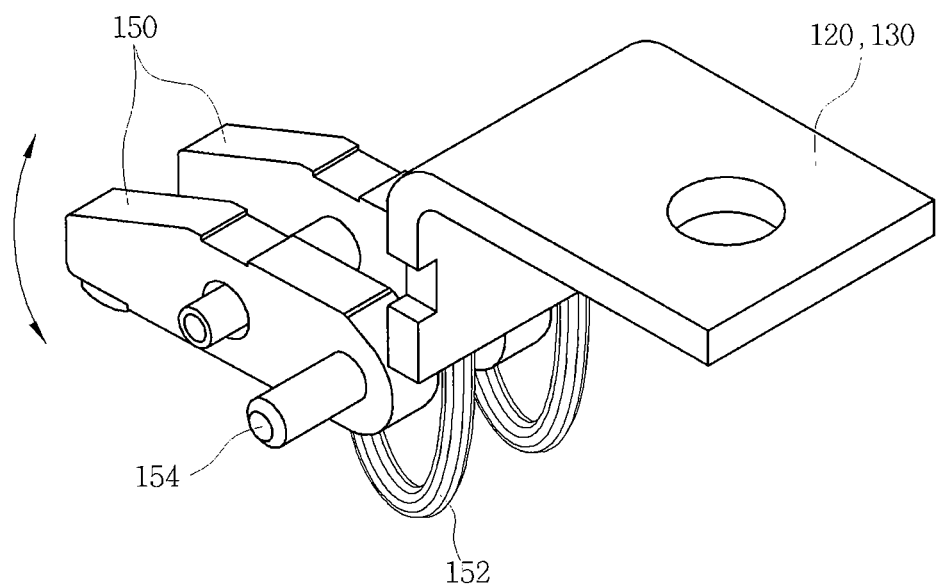
FIG. 3 is a diagram schematically showing a movable contactor and a load terminal used in the automatic transfer switch according to the exemplary embodiment of the present invention.

In this case, the pair of movable contactors 150 are integrally formed with the commercial power terminal 120 or the emergency power terminal 130 through a flexible wire 152 and as a result, is formed to be electrically connected to the commercial power terminal 120 or the emergency power terminal 130 at all times regardless of the rotation in an arrow direction, as shown in FIGS. 2 and 3.

That is, the movable contactors 150 according to the related art are short-circuited by the rotation of the movable contactors 150 in the state in which they are separately formed from the power terminals 120 and 130 to increase the resistance, thereby causing power loss or generating internal heat due to the arc. However, the movable contactors 150 and the power terminals 120 and 130 used in the exemplary embodiment of the present invention are integrally formed by the flexible wire 152, such that the above-mentioned problems are not caused.

Therefore, the automatic transfer switch 100 according to the exemplary embodiment of the present invention may efficiently supply power without power loss and minimize heat generation by not generating the arc that may be generated at the time of a short-circuit since the movable contactors are integrally formed with the power terminals.

In addition, the pair of movable contactors 150 are each coupled with swivel arms 160 through an inserting plate 156.

One end of the swivel arm 160 is pivotably coupled with the rotating shaft 162 and the other end thereof is pivotably coupled with the movable contactor 150 through the inserting plate 156. The rotating shaft 162 may serve to turn off the commercial power supply and the emergency power supply and connect to the commercial power supply or the emergency power supply by pivoting the swivel arm 160 according to the driving scheme of the mechanism.

That is, the movable contactor 150 coupled through the inserting plate 156 rotates according to the pivoting of the swivel arm 160 so as to alternatively contact the load terminal 140, thereby connecting or disconnecting the power supply.

Therefore, power loss may be minimized and the rising of the internal temperature may be reduced by efficiently connecting the movable contactors 150 with the power terminals while simplifying the configuration.

As shown in FIG. 2, the arc extinguishing chamber 170 is disposed at both ends of the pair of movable contactors so as to be correlated with the rotating radius (an arrow direction) of the movable contactors 150 contacting the load terminal 140 and is installed so as to extinguish the arc generated when the movable contactor 150 is contacted or short-circuited with the load terminal 140.

Figure 4:
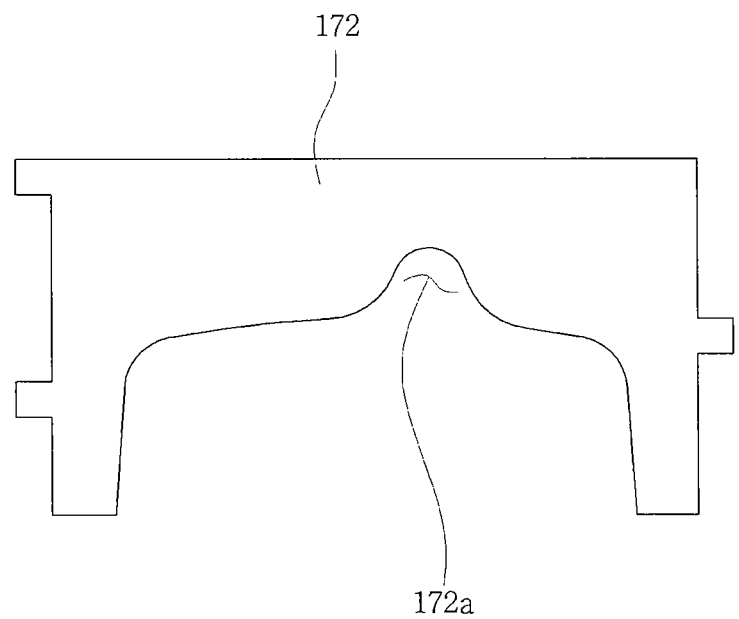
FIG. 4 is a perspective view schematically showing grids used in the automatic transfer switch according to the exemplary embodiment of the present invention.

In detail, in the arc extinguishing chamber 170, the plurality of grids 172 are formed to surround one end of the movable contactor 150 rotating by the driving of the swivel arm 1. As shown in FIG. 4, one side of the grid is concaved and the movable contactor 150 is rotatably installed inwardly at the concaved portion.

In this configuration, the grid 172 formed to be concaved inwardly is eccentrically provided with a chute part 172a such that the arc generated when the load terminal 140 is short-circuited with the movable contactor 150 may be concentrated on the chute part 172a of the grid 172.

Figure 5:
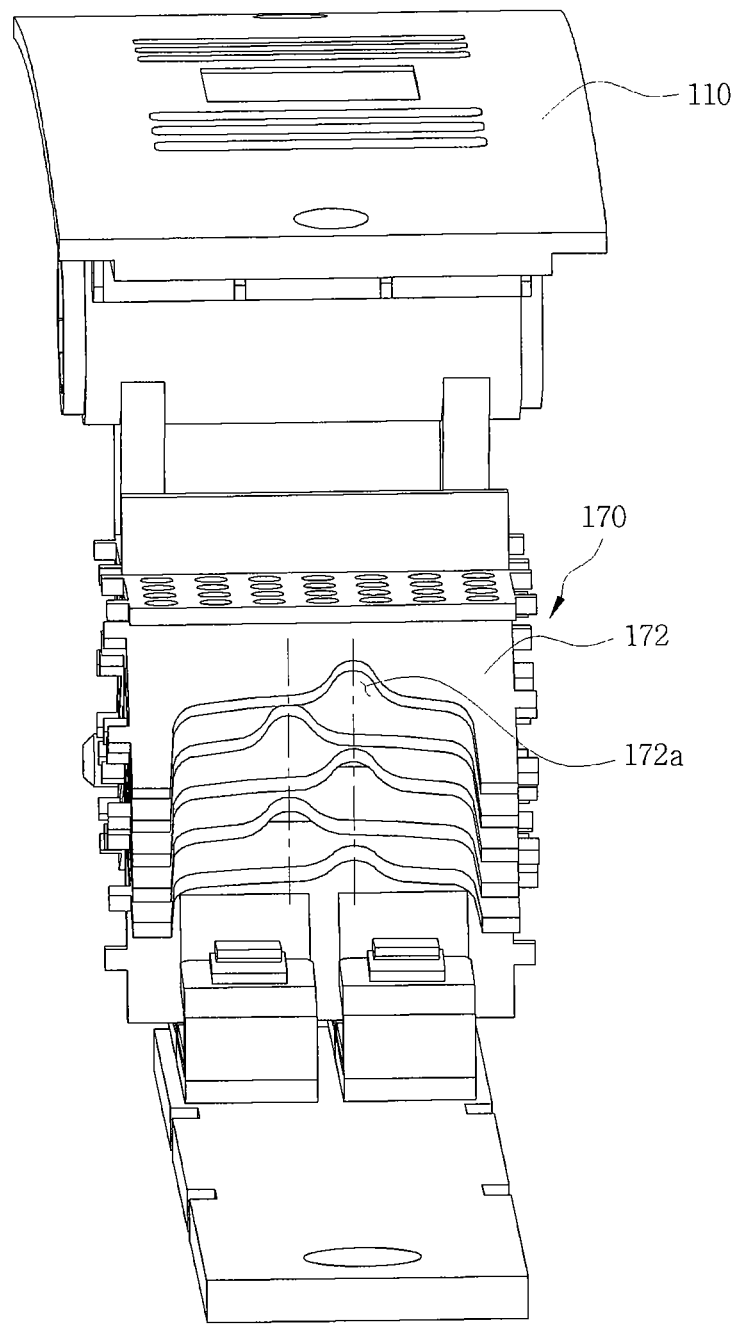
FIG. 5 is a side view schematically showing a shape in which grids used in the automatic transfer switch according to the exemplary embodiment of the present invention are arranged.

In addition, as shown in FIG. 5, in the grid 172 formed in the above-mentioned structure, the chute part 172a is disposed in a zigzag form to disperse the potential difference at the time of the arc generation, thereby preventing the grid 172 from being damaged.

In this case, since the grid according to the related art does not include the chute part 172a formed in the grid 172 of the exemplary embodiment of the present invention, the arc is concentrated at both sides irregularly concaved when the arc are generated and thus, it is difficult to effectively disperse the arc. That is, the arc may be concentrated in one direction in some cases to increase the time according to the arc extinguishing. However, since the grid 172 used in the exemplary embodiment of the present invention may disperse the arc through the chute part 172a as the user's intention, extinguishing of the arc can be effectively performed.

Figure 6:
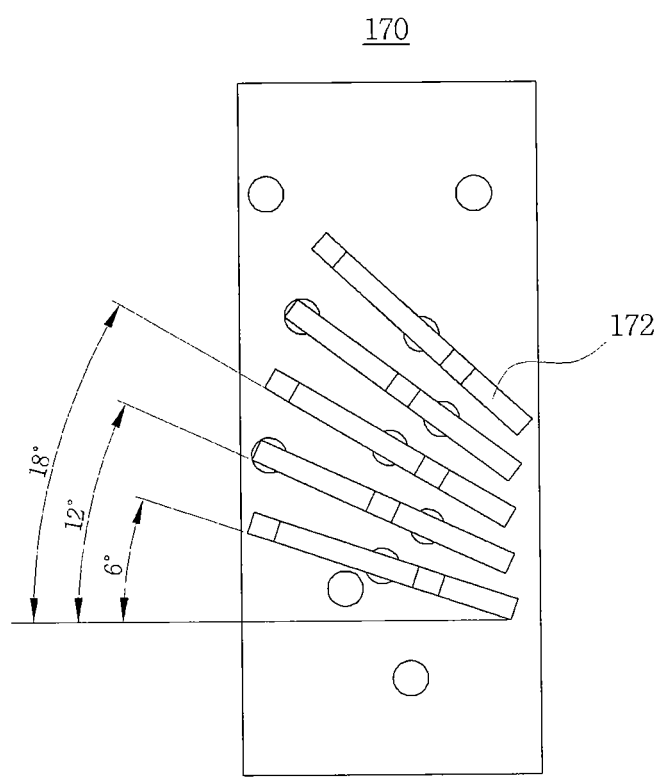
FIG. 6 is a diagram schematically showing a shape in which the grids used in the automatic transfer switch according to the exemplary embodiment of the present invention are inclinedly arranged.

In addition, as shown in FIG. 6, the plurality of grids 172 are inclinedly formed to have a predetermined angle, thereby effectively removing heat generated from the grid 172 while rapidly and accurately extinguishing the arc.

In this case, if the grid 172 has an angle extinguishing the arc within the rapid time, the grid 172 may be changed into various angles. Preferably, as shown in FIG. 6, the grid disperses the potential difference by arranging to be gradually inclined to 5 to 10 degrees to surround the rotating movable contactor 150, such that the ventilation is smoothly performed while extinguishing the arc within the rapid time, thereby effectively removing heat generated in the grid 172.

Figure 7:
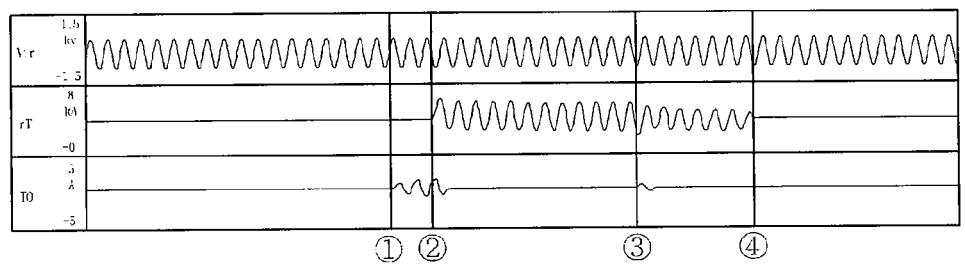
FIG. 7 is a comparison diagram between extinguishing time according to the automatic transfer switch according to the related art and extinguishing time according to arc extinguishing of the automatic transfer switch according to the exemplary embodiment of the present invention.
Figure 7:
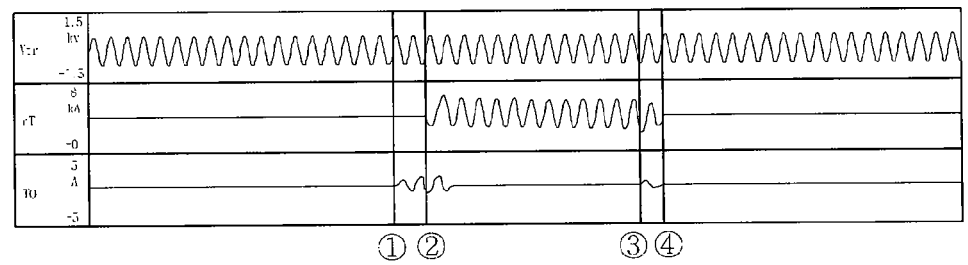

FIG. 7 shows a table of comparing the arc extinguishing rate of the automatic transfer switch according to the related art with the arc extinguishing rate of the automatic transfer switch according to the exemplary embodiment of the present invention. Referring to the Table, when a current of 10 cycles is equally input to the arc extinguishing chamber 170 of the automatic transfer switch, the automatic transfer switch according to the related art exhaust the arc extinguishing time at 100 m/s but the automatic transfer switch 100 according to the exemplary embodiment of the present invention exhaust the arc extinguishing time at 15 m/s, thereby rapidly extinguishing the arc at about 85 m/s.

The automatic transfer switch 100 having the above-mentioned configuration according to the exemplary embodiment of the present invention can extinguish the arc within a rapid time while simplifying the configuration and efficiently extinguishing the arc, thereby preventing the grid 172 having the arc extinguishing chamber 170 from being damaged by dispersing the potential difference.

In addition, the exemplary embodiment of the present invention smoothly perform ventilation, thereby efficiently removing heat in the automatic transfer switch 100, preferably, the arc extinguishing chamber 170.

Although the exemplary embodiments of the present invention have been described, it can be apparent to those skilled in the art that the present invention can be changed and modified in various forms by addition, change, removal, or supplement of a component within the sprite and scope of the present invention described in claims and these changes and modifications are included in the scope of the present invention.

What is claimed is:

1. An automatic transfer switch alternatively supplying power from a commercial power terminal and an emergency power terminal to load terminals by moving a pair of movable contactors, wherein at least one of the pair of movable contactors is integrally formed with the commercial power terminal or the emergency power terminal through a wire made of a flexible material, wherein said automatic transfer switch further comprises an arc extinguishing chamber which comprises a plurality of grids which extinguish an arc generated when the pair of movable contactors are short-circuited with the load terminals, wherein the plurality of grids are formed to surround the movable contactors that vertically rotates, one side thereof is concaved, and the concaved inside thereof is eccentrically provided with a chute part, and wherein the plurality of grids are installed so that said chute part is disposed in a zigzag form.

2. The automatic transfer switch according to claim 1, wherein the plurality of grids are inclinedly arranged to increase upwardly at a predetermined angle.

3. The automatic transfer switch according to claim 2, wherein the plurality of grids are arranged to be gradually inclined at 5 to 10 degrees.

\* \* \* \* \*